United States Patent
Iseki et al.

[11] Patent Number: 6,065,197
[45] Date of Patent: May 23, 2000

[54] METHOD OF SPREADING A SHEET ON A FRAME MEMBER AND METHOD OF MANUFACTURING A CHAIR BY THE SHEET SPREADING METHOD

[75] Inventors: Toru Iseki, Okazaki; Takehiko Kawashima, Hashima, both of Japan

[73] Assignees: Aichi Co., Ltd.; Asahi Gomu Kako K.K., both of Nagoya, Japan

[21] Appl. No.: 09/259,872

[22] Filed: Mar. 1, 1999

[30] Foreign Application Priority Data

Apr. 6, 1998 [JP] Japan ............................ 10-093289

[51] Int. Cl.[7] ............................ B68G 7/00; B32B 31/06; B29C 3/10
[52] U.S. Cl. ...................... 29/91.1; 29/448; 29/458; 264/137; 264/258; 264/261; 264/266; 264/273
[58] Field of Search .................... 29/91.1, 91.5, 29/448, 449, 458; 264/135, 136, 137, 257, 258, 261, 266, 273, 279.1; 156/295, 308.4, 309.6, 311

[56] References Cited

U.S. PATENT DOCUMENTS

| | | | |
|---|---|---|---|
| 2,838,100 | 6/1958 | Follows | 29/91.1 |
| 2,845,699 | 8/1958 | Woodward | 29/448 |
| 4,555,293 | 11/1985 | French | 156/308.4 |
| 4,861,462 | 8/1989 | Lehmann et al. | 29/448 |

FOREIGN PATENT DOCUMENTS

| | | |
|---|---|---|
| 54-6644 | 3/1979 | Japan . |
| 54-20900 | 7/1979 | Japan . |
| 54-23523 | 8/1979 | Japan . |
| 56-21039 | 5/1981 | Japan . |
| 61-12830 | 4/1986 | Japan . |
| 2-9723 | 3/1990 | Japan . |

*Primary Examiner*—S. Thomas Hughes
*Assistant Examiner*—Eric Compton
*Attorney, Agent, or Firm*—Davis and Bujold

[57] ABSTRACT

The present invention realizes spreading a sheet on a frame member by a simple structure and a simple process, and prevents uneven tension charged against the sheet. In the sheet spreading method of the invention, a core member for a backrest of a chair which is heated to around 200° C. in a furnace is put into a flow dipping tank filled with powder resin. As a result, a resin coating is formed on the surface of the pipe constituting the core member. Also, a mesh is placed on a metal mold and clamped. Since a recess corresponding to the shape of the core member is formed in the top side of the metal mold, the mesh is spread on the core member with a tension charged against when the core member having the above-mentioned coating is pressed into the recess.

7 Claims, 6 Drawing Sheets

METHOD OF SPREADING A SHEET ON A FRAME MEMBER AND METHOD OF MANUFACTURING A CHAIR BY THE SHEET SPREADING METHOD

BACKGROUND OF THE INVENTION

The invention relates to a method of spreading a sheet on a frame-like member such as a core member of a chair seat.

Conventional methods of spreading a square wire mesh on the square frame of a chair are disclosed, for example, in Japanese Examined Utility Model Publication No.Sho54-23523 and Japanese Examined Utility Model Publication No.Sho61-12830.

The former discloses that by inserting a steel wire into each of two opposite sides of a wire mesh, and attaching coil springs having hooks at both ends, with one hook to the steel wire and the other hook to the wire mesh, the wire mesh is spread with a prescribed tension charged against it, by taking advantage of the energizing force of the coil springs.

The latter discloses that a wire mesh is spread by inserting an adapter plate into each of two opposite sides of the wire mesh and then screwing or rivet caulking the adapter plates onto the metal frame while keeping a prescribed tension charged against the wire mesh.

In Japanese Examined Utility Model Publication No.Hei2-9723, it is disclosed that a cushion material made of cloth, having flexibility, is spread and fixed by wrapping the cushion material around the frame and bonding or sewing it to the same.

One of the major problems of a chair formed in accordance with the aforementioned prior arts is that such a chair is not comfortable to sit on because the wire mesh or the like, which is stretched in only two opposite directions, flexes in a limited number of directions.

When the prior arts are applied to products other than a chair (for example, a filter for an air conditioner made by spreading a mesh-like material on a frame member), there are disadvantages, as in the increased time it takes to assemble the larger number of parts, such as hooks and screws, or as in the increased difficulty in making products with an even tension charged against, thus making products of uneven quality.

In relation to a chair, it is described in Japanese Examined Utility Model Publication No. Sho54-6644 and Japanese Examined Patent Publication No.Sho54-20900 that a core member, on which a cloth covering is spread, is fit into a frame-like cover formed out of resin. It is described in Japanese Examined Utility Model Publication No. Sho56-21039 that a core member, on which a cloth covering is spread, is covered with an edge cover formed by extrusion molding of resin. Purportedly, these processes are employed in order to prevent the cloth covering from coming off, as well as, to protect the core member.

However, it takes a lot of time and effort to fit the edge member to a chair. There is also a problem that the edge member is apt to be in an uneven finished state and thus, might come off easily.

SUMMARY OF THE INVENTION

Wherefore, an object of the invention is to provide a method of spreading a sheet on a frame member, which prevents an uneven tension charged against the spread sheet, and by reducing the number of parts necessary for the spreading, enables a more economical sheet spreading process.

Another object of the invention is to provide a method of easily forming a protective member (equivalent to an edge member) for protecting the frame member.

A further object of the invention is to apply the above sheet spreading method and protective member forming method to the seat and the backrest of a chair.

In the sheet spreading method of the invention, placed on a metal mold having a recess corresponding to the shape of a frame member formed therein and a cooling device attached thereto, is a sheet larger than needed for spreading it on the frame member. The sheet is clamped to the metal mold in at least four directions. A molten coating of thermoplastic resin is then formed on the surface of the frame member. When the frame member having the resin coating is fit into the recess of the metal mold with the clamped sheet, part of the resin penetrates the sheet. With cooling device actuated next, the resin coating hardens securing the sheet to the frame member.

The process of spreading a sheet on the frame member is completed when the frame member is released from the clamping and taken out of the metal mold. Since the attached sheet is larger than needed, the excess of the sheet is removed by trimming along the periphery either before or after taking the frame member out of the metal mold.

Since the ultimate tension charged against the spread sheet depends on the shape of the frame member, the ultimate tension is thus controllable by adjusting the frame member's shape.

Therefore, according to the method of the invention, it is possible to spread a sheet on a frame member with an even tension charged against by means of simple structures, such as an aforementioned metal mold and clamps, and of a simple process of forming a coating. Moreover, the metal mold and the clamps are reusable when the shape of the frame member is the same. Therefore, if the present method is employed to spread a sheet on a large number of frame members, the number of necessary elements per frame member can be relatively reduced.

The order of two processes, i.e. clamping a sheet and forming a coating on the frame member, is decided in accordance with the hardenability of the coating because the coating should be molten at least at the time of fitting the frame member into the recess. Specifically, if the coating hardens in a short time, the sheet is clamped first and then the coatings formed on the frame member, which is promptly fit into the recess. If the coating takes time to harden, oppositely, either process may be performed first.

In the sheet spreading method of the invention, the frame member is made of metal, the sheet is a resin mesh or a wire mesh, and the coating is formed by melting and making a powder resin adhere to a preheated frame member.

Although the frame member is preheated in order for the powder resin to melt and adhere, the sheet will not melt when the frame member is pressed into the recess if the sheet is a wire mesh. When polyester, which is heat-resistant up until 230° C., is employed as a resin, the problem of melting the sheet is avoidable so long as the temperature of the frame member is kept below 230° C. (for example 200° C.).

According to the sheet spreading method of the invention, a pre-heated frame member is placed in a flow dipping tank in which powdered resin is suspended in order to make the resin adhere to the frame member. As described, only by placing the frame member in a flow dipping tank, the powder resin melts and adheres to the frame member, and thus the coating is formed making the whole sheet spreading process quite simple.

It is also described in the invention that powder resin is sprinkled in the recess before clamping the sheet on the metal mold. In this case, when the preheated frame member is pressed into the recess, the powder resin melts and penetrates the sheet, and thus, surface treatment of the sheet is performed. Specifically, the part of the sheet surrounding the frame member is covered with an even resin coating, thereby producing an equal finished state of surface treatment to every product.

It is further described in the invention that the thickness of the coating is determined to ensure that by the time of removing the frame member from the metal mold the resin has collected like beading along the border line between the sheet and the frame member. Doing so prevents the sheet from easily coming off on the border line and enables the sheet to be charged with a higher tension.

As aforementioned, according to the sheet spreading method of the invention, it is possible to spread, with an even tension charged against it, a sheet on a frame member. Therefore, if the method is applied to the seat or the backrest of a chair, non-directional flexibility is obtained and thus, such a chair is comfortable to sit on.

When the invention is applied to the seat or the backrest of a chair, a cloth covering may be employed as the sheet or arranged under the wire mesh, enabling the cloth covering also to be spreadable. Further, if the recess in the metal mold is formed corresponding to the required surface shape of the cloth covering, and in addition to the cloth covering, a urethane foam cushion and a sheet (a mesh is preferable) are laid in this order on the metal mold, those being spreadable at one time, a simpler process of forming a cushioned chair seat or backrest by spreading is enabled.

Another aspect of the invention is a method of forming a protective member for protecting a frame member, which comprises of forming a protective member of a synthetic resin wrapping from the periphery of the frame member to the border line between the frame member and the sheet by injection molding of synthetic resin after putting the frame member, with the sheet already spread, into the metal mold for injection molding.

This method extremely simplifies the protective member forming process. Since the protective member is formed integrally with the frame member, in addition to having a good finished appearance, its adhesion to the frame member is quite strong, thus the protective member does not come off or break easily from the frame member.

When a cloth covering is also spread on the frame member, the above protective member is especially advantageous. By applying this method, a seat or a backrest having a protective member formed around its core member is easily manufactured.

BRIEF DESCRIPTION OF THE DRAWINGS

The invention will now be described, by way of example, with reference to the accompanying drawings, in which.

DETAILED DESCRIPTION OF THE PREFERRED EMBODIMENT

A preferred embodiment of the invention is described hereafter with reference to the drawings.

Figure 1A:
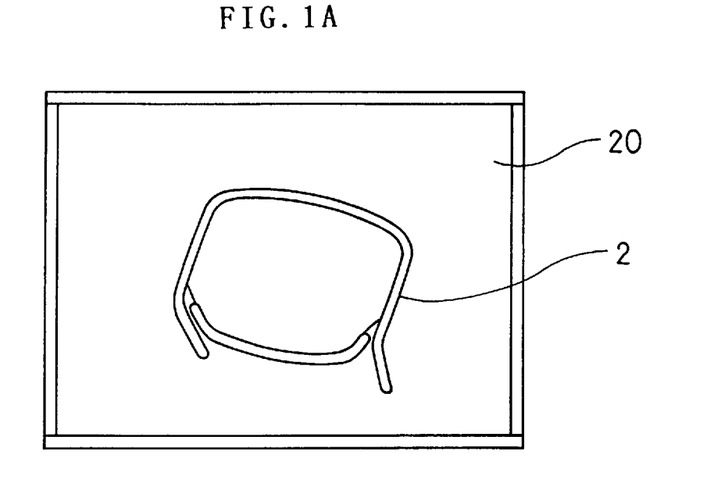
FIGS. 1A through 1C and FIGS. 2A through 2D are explanatory views showing the process of spreading a mesh on the core member of a backrest according to an embodiment of the invention.
Figure 1B:
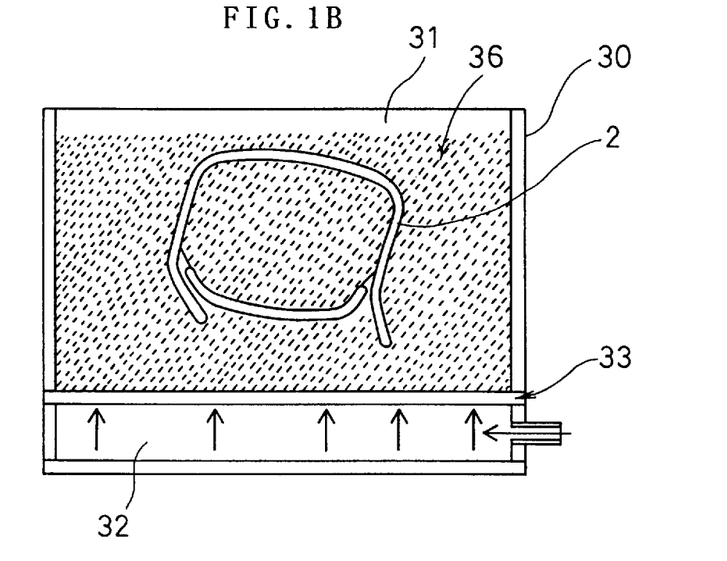
Figure 1C:
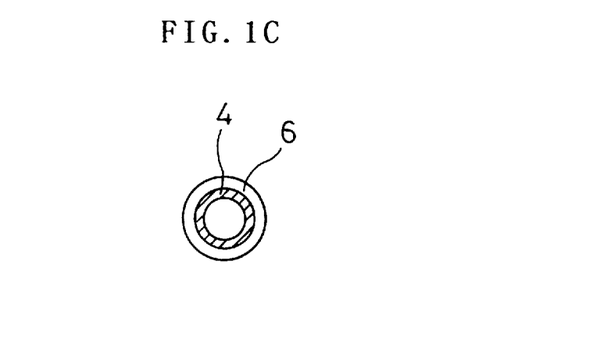

FIGS. 1A through 1C and FIGS. 2A through 2D show the process of spreading a mesh on a core member 2 of a chair backrest by the method of spreading a sheet according to the invention. First, the core member 2 is prepared by bending a pipe and welding the same to form a frame member. The core member 2 is heated to around 200° C. in a furnace 20 as shown in FIG. 1A and placed in a flow dipping tank 30 as shown in FIG. 1B. The flow dipping tank 30 comprises a powder resin suspension chamber 31 filled with powdered thermoplastic resin 36 (hereinafter referred to as "powder resin 36") and a pressurized air chamber 32 into which air is introduced from the outside. Between the powder resin suspension chamber 31 and the pressurized air chamber 32 is provided a filter 33 in order to prevent an outflow of powder resin 36 from the powder resin suspension chamber 31 to the pressurized air chamber 32. When air is introduced to the pressurized air chamber 32 from the outside, the air passes through the filter 33 and makes the powder resin 36 in the powder resin suspension chamber 31 suspended. The suspended powder resin 36 melts and adheres to the surface of the preheated core member 2. FIG. 1C shows a cross section of the core member 2 to which the powder resin 36 has adhered. As shown in this figure, a coating 6 of the powder resin 36 is formed on the surface of the pipe 4 which constitutes the core member 2. The coating 6 is formed with a thickness of about 500 μm or more.

Figure 2A:
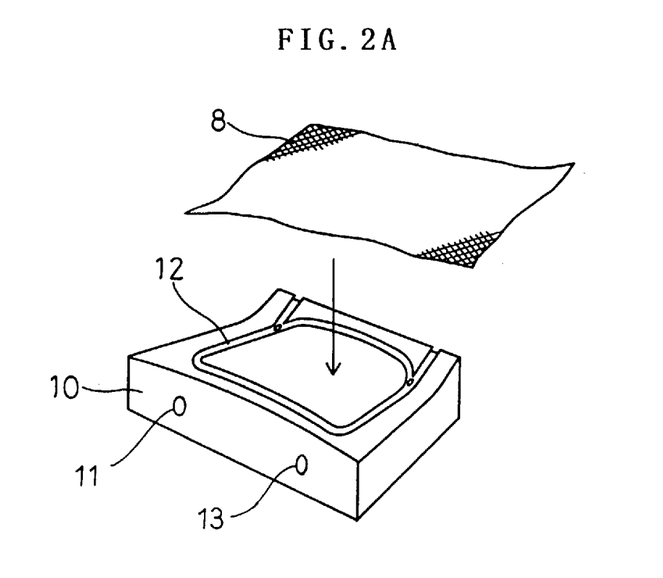

As shown in FIG. 2A, a mesh 8 is placed on a metal mold 10. The mesh 8 is cut into a rectangular which is one size larger than the core member 2. A recess 12 whose shape corresponds to that of the core member 2 is formed in the top side of the metal mold 10, which is provided with a cooling device for cooling the metal mold 10. Specifically, in the metal mold 10 is provided a cooling water circulation channel along the recess 12, through which cooling water is circulated in order to cool the metal mold 10. FIG. 2A shows a cooling water inlet 11 for pouring cooling water into the cooling water circulation channel and a cooling water outlet 13 for discharging the water whose temperature has been raised due to being circulated in the cooling water circulation channel.

The metal mold 10 and the manner of clamping are explained hereinafter with reference to FIG. 3.

Figure 3:
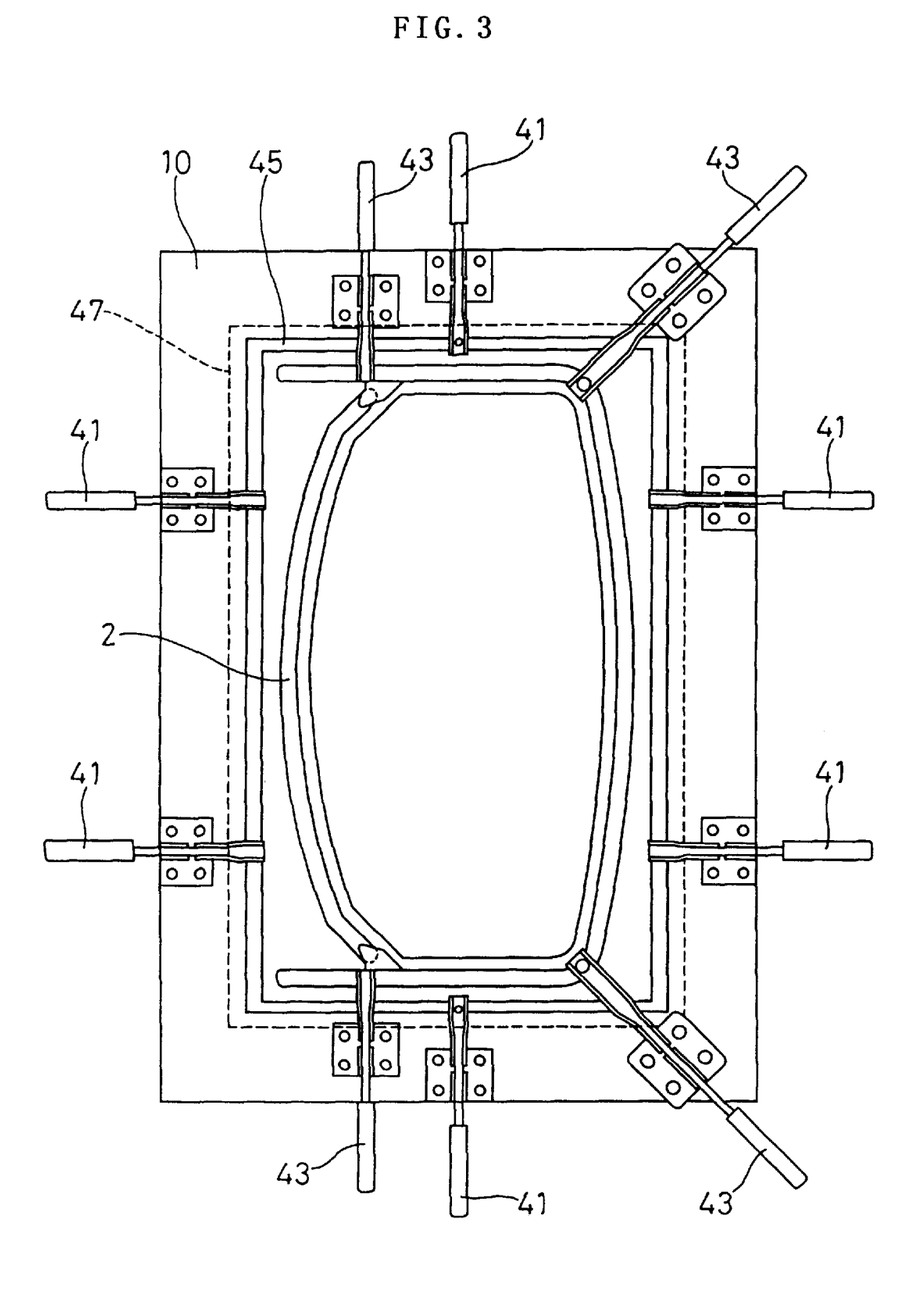
FIG. 3 is a plan view showing how the mesh and the core member are clamped to a metal mold.

FIG. 3 is a plan view of the metal mold 10, showing the state of the core member 2 being put into the recess 12. As illustrated, the metal mold 10 is provided with six clamp handles 41 for clamping the mesh 8 and four clamp handles 43 for pressing the core member 2 against the metal mold 10. Numeral 45 represents a rubber frame, and numeral 47 represents the position where the mesh 8 is placed. The clamp handles 41 are designed to press the mesh 8 on the rubber frame 45, which enables a tight clamping of the mesh 8.

Figure 2B:
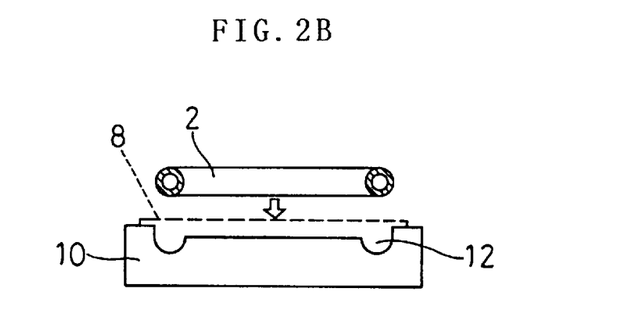
Figure 4:
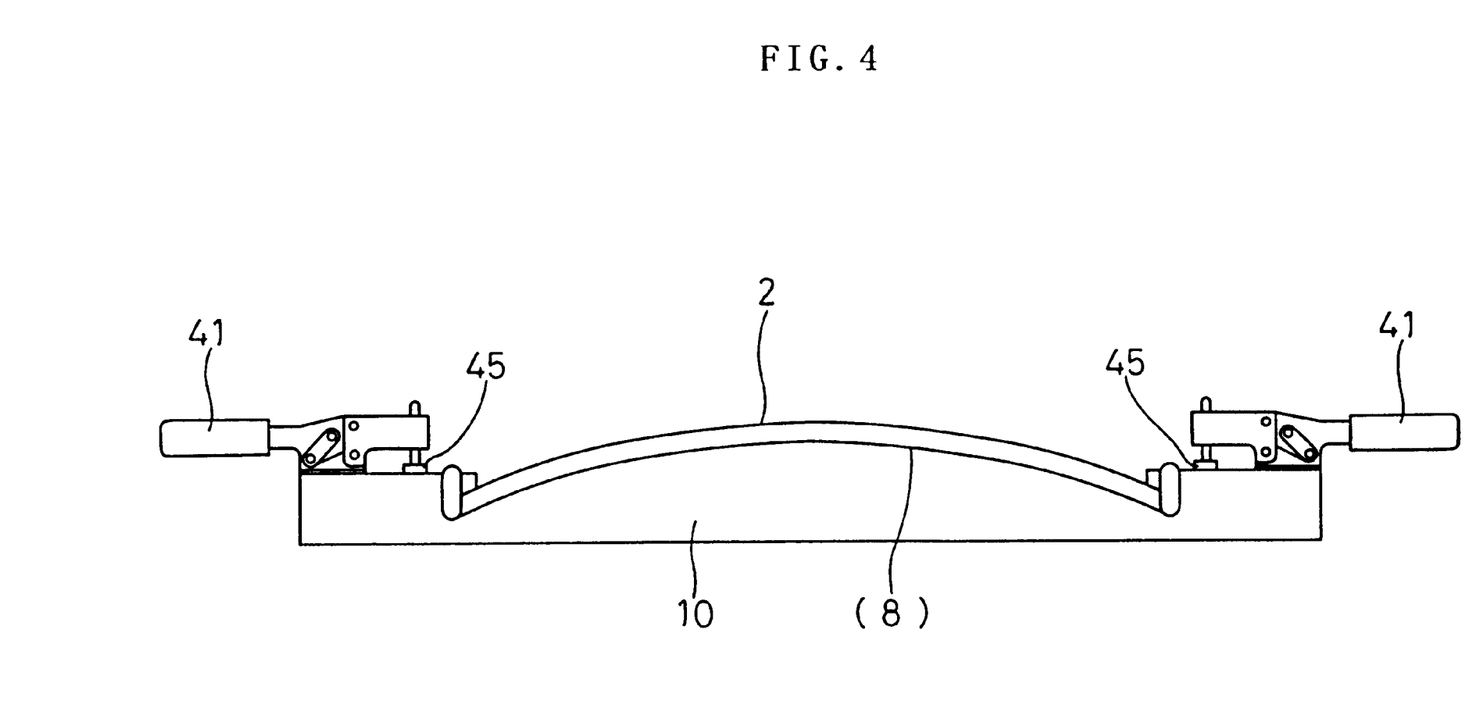
FIG. 4 is a side elevational view showing how the mesh and the core member are clamped to the metal mold.

As shown in FIG. 2B, the mesh 8 is clamped to the metal mold 10, and then the core member 2 is placed on the mesh 8 and pressed with the clamp handles 43 (See FIG. 3). This state is illustrated in FIG.4 which is a side elevational view taken from the right side of FIG.3. When the core member 2 is pressed against the metal mold 10 with the clamp handles 43 (not shown) as shown in FIG.4, the mesh 8, which is sandwiched by the core member 2 and the metal mold 10, transforms in accordance with the shape of the recess 12 in the metal mold 10 with a tension charged against, and at the same time part of the resin which forms the coating 6 adhering to the surface of the core member 2 penetrates the mesh 8.

Figure 2C:
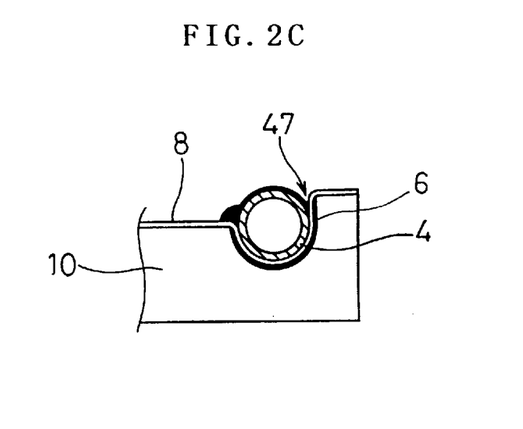
Figure 2D:
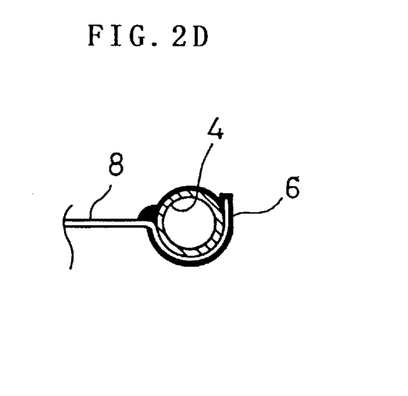

Subsequently, when the coating 6 becomes solid by cooling, the mesh is fixed to the core member 2 with a tension charged against. As shown in FIG. 2C, the resin collects like beading along the border line between the mesh 8 and the pipe 4, which prevents the mesh 8 from easily coming off even though a load is applied to the same. Then, the clamp handles 41 and 43 are released, and the core member 2 is removed from the metal mold 10. When an excess of the mesh 8 is removed by trimming off along the periphery, the whole spreading process is completed (FIG. 2D).

Although it has not been mentioned above, the mesh 8 may be clamped to the metal mold 10 with a prescribed tension charged against. One of the methods of charging a tension against the mesh 8 is to firstly clamp one of the opposite two sides of the mesh 8, secondly pull the other side away from the above clamped side, thereby charging a tension, and finally clamp the other side.

According to this sheet spreading method, it is possible to spread the mesh 8 on the core member 2 with a desired tension charged against by a simple structure and a process as aforementioned. It is also possible to spread a mesh on the core member of a chair seat by the same process. FIGS. 5A through 5F illustrate this process schematically.

Figure 5A:
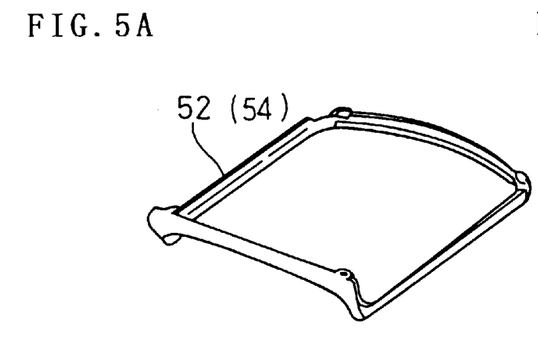
FIGS. 5A through 5F are explanatory views showing the process of spreading a mesh on the core member of a seat according to the embodiment of the invention.
Figure 5B:
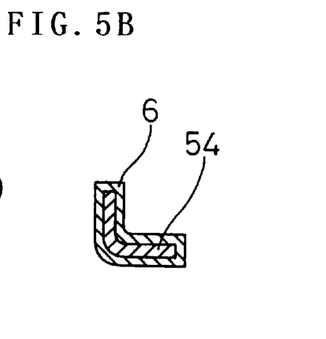

The core member 52 of the chair seat is formed as a frame member, as shown in FIG. 5A, by bending a sheet metal to a L-shaped cross section, further bending the above bent metal 54 to an almost square shape, and then welding the same. Since the core member 52 is heated to around 200° C. and put into a flow dipping tank filled with powder resin, the same as the core member 2, a resin coating 6 with a thickness of about 500 μm or more is formed on the surface as shown in FIG. 5B.

Figure 5C:
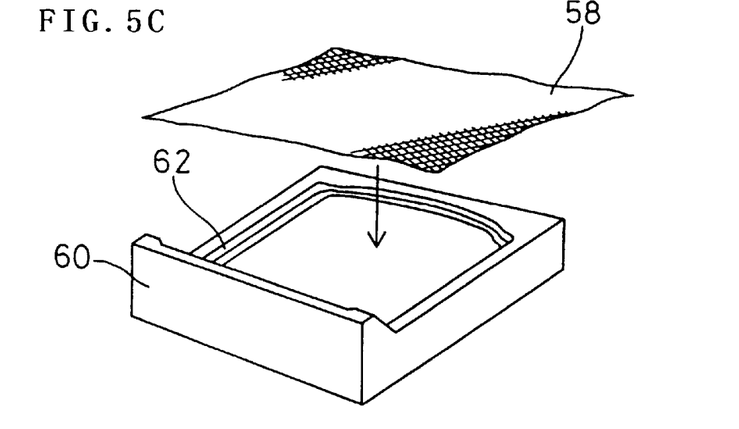
Figure 5D:
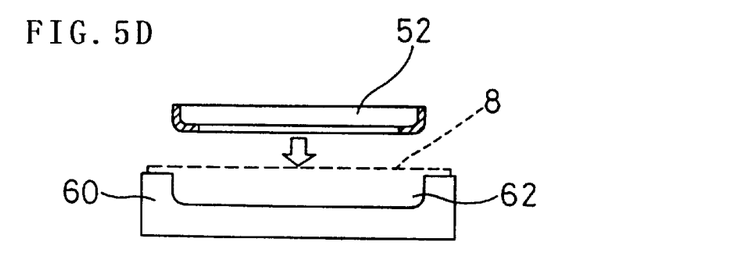
Figures 5E, 5F:
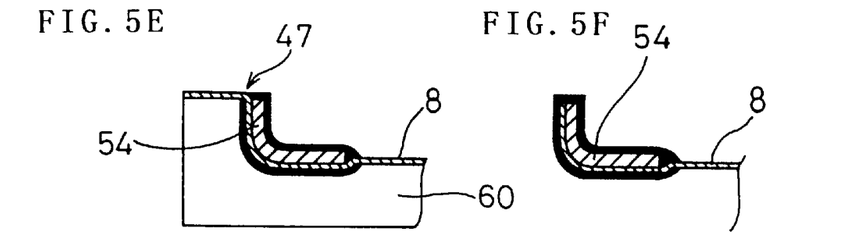

As shown in FIG. 5C, a mesh 58 is placed on a metal mold 60 having an inner surface 62 formed in accordance with the shape of the core member 52 and is clamped. When the core member 52 is pressed against the metal mold 60 (FIG. 5D), part of the resin which forms the coating 6 penetrates the mesh 8. Subsequently, the coating 6 becomes solid by cooling, and the spreading process is completed (FIGS. 5E, 5F).

By applying the sheet spreading method of the invention, as described above, it is possible to spread the mesh 58 on the core member 52, which is made of a sheet metal, with a tension charged against the mesh 58 by a simple structure and a process.

The backrest and the seat of a chair which are formed by spreading the meshes 8 and 58 on the core members 2 and 52, respectively, according to the above described method have non-directional flexibility and such a chair is comfortable to sit on.

Although some embodiments of the invention have been described, the invention is not restricted to such embodiments and may be embodied in various forms without departing from the spirit and the scope of the invention.

Figure 6A:
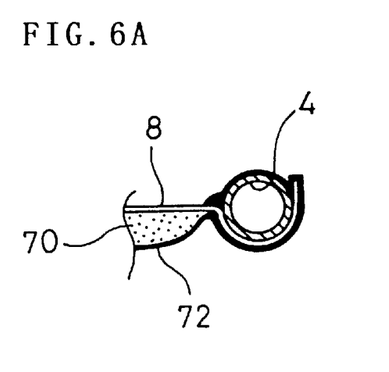
FIGS. 6A through 6D are explanatory views showing other embodiments of the invention.
Figure 6B:
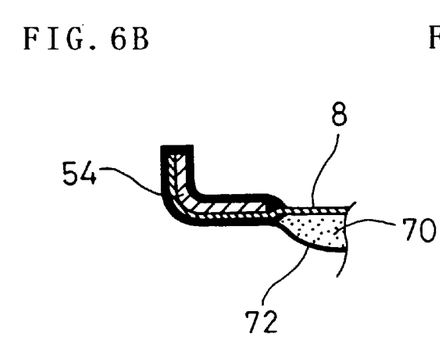

For example, as shown in FIG. 6A, it may be possible to form the recess 12 in the metal mold 10 in accordance with the required surface shape of a cloth covering 72 of the backrest and clamp the cloth covering 72 and the mesh 8 with a cushion 70 between them. In this case, spreading and fixing the cloth covering 72 and the cushion 70 are also completed at the same time, which means an achievement of a simpler process. As shown in FIG. 6B, it may also be possible to form the recess 62 in the metal mold 60 in accordance with the required surface shape of a cloth covering 72 of the seat and clamp the cloth covering 72 and the mesh 8 with a cushion 70 between them.

Figure 6C:
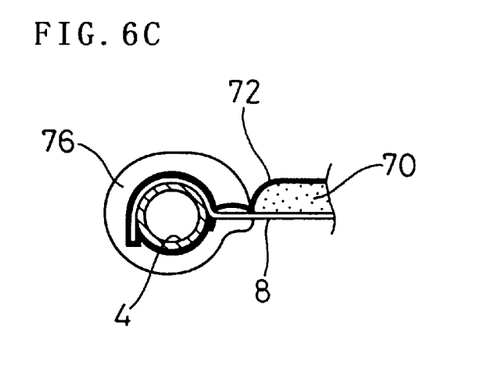

Further, a modification shown in FIG. 6C may be possible. It illustrates that the backrest, on which the cloth covering 72 also has been spread as shown in FIG. 6A, is put into a metal mold for injection molding and thus a protective member 76 is formed. In this case, the protective member 76 for the cloth covering 72 can be easily formed and the finished appearance is favorable. There is the conventional art of fitting a backrest with a cloth covering already spread into a frame which is injection molded separately (equivalent to the protective member 76). Such a frame has a disadvantage of being apt to come off easily or even break. In the embodiment, the disadvantage can be overcome by employing the protective member 76 because the same is formed integrally with the pipe 4 and other parts.

Figure 6D:
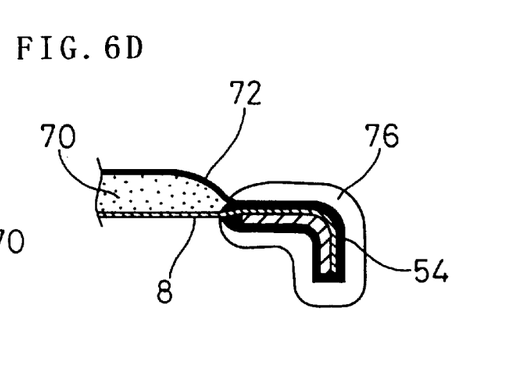

As shown in FIG. 6D, a seat shown in FIG. 6B may also be put into a metal mold designed for injection molding for a seat to form the protective member 76.

Also, the formation of the protective member 76 may be applied to a core member on which a mesh or the like is spread by the processes other than the aforementioned.

What is claimed is:

1. A method of spreading a sheet on a frame member, comprising the steps of:

placing a sheet, which is cut into a size larger than the exact size to be spread on a frame member, on a metal mold having a recess formed corresponding to the shape of said frame member and a cooling device attached;

clamping said sheet to said metal mold in at least four directions, while forming a molten coating of thermoplastic resin on said frame member;

setting said frame member with said coating formed into said recess of said metal mold while keeping said sheet clamped in such a way that a tension is charged against said sheet, thereby letting part of said resin forming said coating penetrate said sheet; and     solidifying said resin which surrounds said frame member and has penetrated said sheet by actuating said cooling device.

2. The method of spreading a sheet on a frame member according to claim 1, wherein said frame member is made of a metal; said sheet is selected from a group consisting of a resin mesh and a wire mesh; and said coating is formed by melting and making a powder resin adhere to said frame member which is preheated.

3. The method of spreading a sheet on a frame member according to claim 2, wherein said powder resin is melted and made to adhere to said frame member by putting said frame member into a flow dipping tank in which said powder resin is suspended.

4. The method of spreading a sheet on a frame member according to claim 1, further including the step of sprinkling powder resin in said recess before clamping said sheet to said metal mold.

5. The method of spreading a sheet on a frame member according to claim 1, further including the step applying a thickness of said coating such that resin collects like beading along the border line between said frame member and said sheet.

6. The method of spreading a sheet on a frame member according to claim 1, wherein said recess corresponds to the shapes of a core member and a top surface of a finished seat; and, further including the step of placing a cloth covering and said sheet, on said metal mold in this order with a cushion there between, and clamping them together to said metal mold.

7. The method of spreading a sheet on a frame member according to claim 1, wherein said recess corresponds to the shapes of a core member and a top surface of a finished backrest; and, further including the step of placing a cloth covering and said sheet, on said metal mold in this order with a cushion there between, and clamping them together to said metal mold.

* * * * *